United States Patent
Meng et al.

(10) Patent No.: US 7,728,921 B2
(45) Date of Patent: Jun. 1, 2010

(54) BRIGHTNESS ENHANCEMENT FILM WITH PROTECTIVE LAYER AND BACKLIGHT MODULE AND LIQUID CRYSTAL DISPLAY WITH SAME

(75) Inventors: Kai Meng, Shenzhen (CN); Che-Kuei Mai, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 496 days.

(21) Appl. No.: 11/638,892

(22) Filed: Dec. 14, 2006

(65) Prior Publication Data
US 2007/0139776 A1  Jun. 21, 2007

(30) Foreign Application Priority Data
Dec. 16, 2005  (TW)  ............... 94144814 A

(51) Int. Cl.
*G02F 1/1335*  (2006.01)
(52) U.S. Cl. .................... 349/62; 349/61; 359/599
(58) Field of Classification Search ............ 349/61–71; 359/599, 529
See application file for complete search history.

(56) References Cited

U.S. PATENT DOCUMENTS

| 5,600,462 A | * | 2/1997 | Suzuki et al. | ............... 349/112 |
| 5,760,960 A | * | 6/1998 | Lin et al. | ............... 359/569 |
| 6,356,389 B1 | * | 3/2002 | Nilsen et al. | ............... 359/625 |
| 6,831,714 B2 | * | 12/2004 | Masaki et al. | ............... 349/112 |
| 6,894,840 B2 | | 5/2005 | Yamanaka et al. | |
| 7,106,395 B2 | | 9/2006 | Maeda | |

FOREIGN PATENT DOCUMENTS

| CN | 1477409 A | 2/2004 |
| CN | 1508595 A | 6/2004 |
| CN | 1658047 A | 8/2005 |
| WO | 2005019879 A1 | 3/2005 |

* cited by examiner

*Primary Examiner*—Dung T. Nguyen
(74) *Attorney, Agent, or Firm*—Wei Te Chung

(57) ABSTRACT

An exemplary brightness enhancement film (15) includes a main body (154), a plurality of first prism structures (152), a plurality of second prism structures (156), and first and second protective layers (150, 158). The main body includes a first side, and a second side opposite to the first side. The first prism structures are formed at the first side. The second prism structures are formed at the second surface. The first protective layer covers the plurality of first prism structures, and the second protective layer covers the plurality of second prism structures.

14 Claims, 3 Drawing Sheets

BRIGHTNESS ENHANCEMENT FILM WITH PROTECTIVE LAYER AND BACKLIGHT MODULE AND LIQUID CRYSTAL DISPLAY WITH SAME

FIELD OF THE INVENTION

The present invention relates to brightness enhancement films (BEFs) such as those used in backlight modules; and more particularly to a BEF with at least one protective layer, and a backlight module and a liquid crystal display (LCD) including the BEF.

GENERAL BACKGROUND

Liquid crystal displays are commonly used as displays for compact electronic apparatuses, because they not only provide good quality images with little power but are also very thin.

Referring to FIG. 6, a typical liquid crystal display 6 includes an upper polarizing film 60, a liquid crystal panel 61, a lower polarizing film 62, an upper BEF 63, a lower BEF 64, a diffusing film 65, a light guide plate (LGP) 66, and a reflective film 67, arranged in that order from top to bottom. Each of the upper BEF 63 and the lower BEF 64 includes a plurality of linear prism structures 69 formed at a respective main body (not labeled) thereof. The prism structures 69 of the upper BEF 63 are perpendicular to the prism structures 69 of the lower BEF 64. The upper BEF 63 and the lower BEF 64 can improve a brightness of the liquid crystal display 6.

However, the prism structures 69 are exposed at outsides of the respective main bodies of the upper BEF 63 and the lower BEF 64. In a process of assembling the liquid crystal display 6, the prism structures 69 are liable to be scraped. When this occurs, an optical performance of the liquid crystal display 6 may be degraded. Further, the upper BEF 63 and the lower BEF 64 are separate from each other, and a step of aligning the upper BEF 63 and the lower BEF 64 is generally needed. The step is typically performed by manual labor, and adds to the cost of manufacturing the liquid crystal display 6.

What is needed, therefore, is a BEF that can overcome the above-described deficiencies. What are also needed are a backlight module and a liquid crystal display employing the BEF.

SUMMARY

In one preferred embodiment, a brightness enhancement film includes a main body, a plurality of first prism structures, a plurality of second prism structures, and at least one protective layer. The main body includes a first side, and a second side opposite to the first side. The first prism structures are formed at the first side. The second prism structures are formed at the second side. The at least one protective layer covers at least one of the plurality of first prism structures and the plurality of second prism structures.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
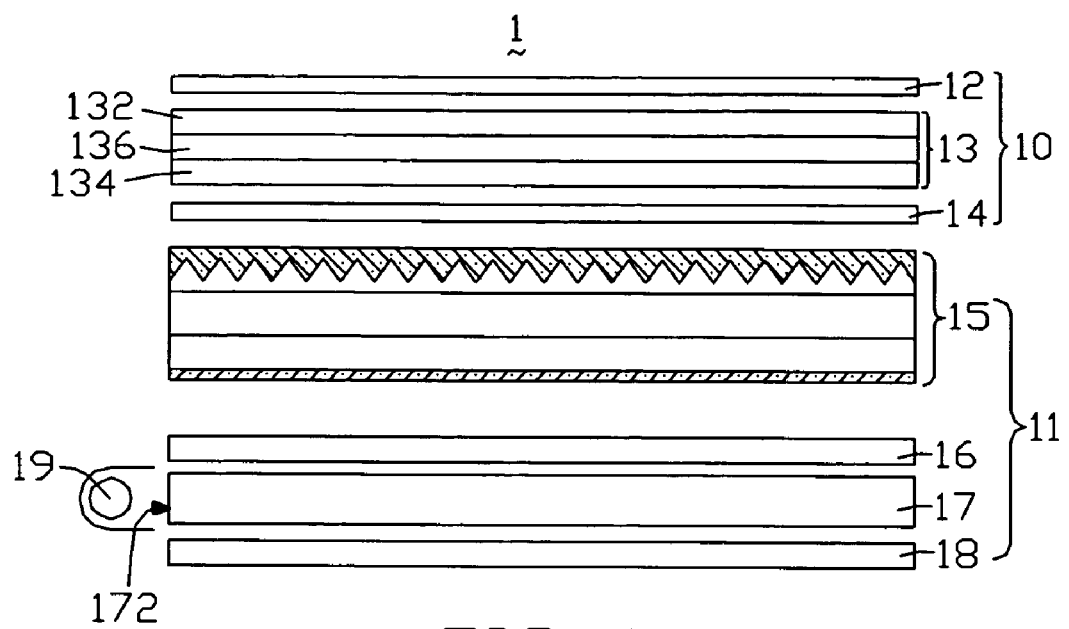
FIG. 1 is an exploded, side cross-sectional view of a liquid crystal display according to a first embodiment of the present invention, the liquid crystal display including a BEF.

Referring to FIG. 1, a liquid crystal display 1 according to a first embodiment of the present invention is shown. The liquid crystal display 1 includes a liquid crystal panel assembly 10, and a backlight module 11 located adjacent to the liquid crystal panel assembly 10.

The liquid crystal panel assembly 10 includes an upper polarizing film 12, a liquid crystal panel 13, and a lower polarizing film 14, arranged in that order from top to bottom. The liquid crystal panel 13 includes an upper substrate 132 located adjacent to the upper polarizing film 12, a lower substrate 134 located adjacent to the lower polarizing film 14, and a liquid crystal layer 136 sandwiched between the upper substrate 132 and the lower substrate 134. The upper substrate 132 and the lower substrate 134 are transparent, and are preferably made from glass.

The backlight module 11 includes a BEF 15, a diffusing film 16, a light guide plate 17, and a reflective film 18, arranged in that order from top to bottom. The BEF 15 is located adjacent to the lower polarizing film 14 of the liquid crystal panel assembly 10. The backlight module 11 further includes a light source 19 located adjacent to a light incident surface 172 of the light guide plate 17.

Figure 2:
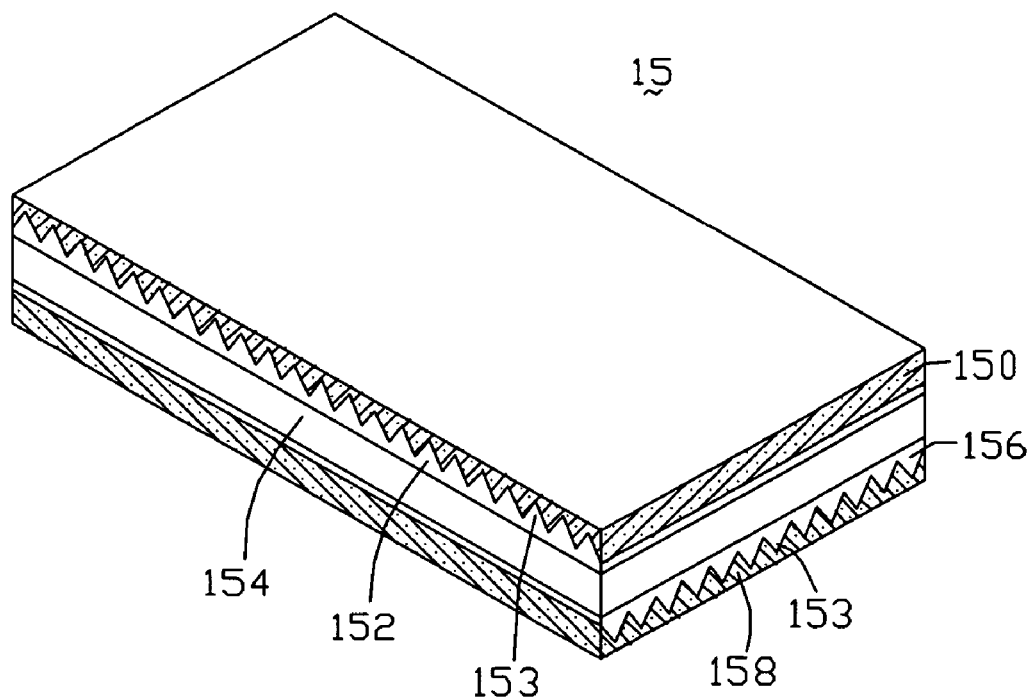
FIG. 2 is an enlarged, isometric view of the BEF of FIG. 1.

Referring also to FIG. 2, the BEF 15 includes an upper protective layer 150, a plurality of upper prism structures 152, a main body 154, a plurality of lower prism structures 156, and a lower protective layer 158, stacked in that order from top to bottom. In the illustrated embodiment, the upper prism structures 152 and the lower prism structures 156 are linear, and are respectively formed at two opposite main surfaces (not labeled) of the main body 154. The upper prism structures 152 and the lower prism structures 156 each have a plurality of parallel prisms 153. Each prism 153 is triangular. Thus a series of adjacent prisms 153 has a saw-toothed shape. An orientation of the upper prism structures 152 is perpendicular to that of the lower prism structures 156. The upper prism structures 152 and the lower prism structures 156 have a same refraction index $n_0$. The upper protective layer 150 covers the upper prism structures 152, and has a refraction index $n_1$. The lower protective layer 158 covers the lower prism structures 156, and has a refraction index $n_2$. The refraction indices of the upper protective layer 150, the upper prism structures 152, the lower prism structures 156, and the lower protective layer 158 are governed by the following inequality: $n_1 < n_0 < n_2$. The upper prism structures 152 and the lower prism structures 156 can be made from modified acrylic resin. The main body 154 is preferably made from material with a refraction index similar to that of the upper prism structures 152 and the lower prism structures 156. In an alternative embodiment, the upper prism structures 152, the main body 154, and the lower prism structures 156 can be integrally formed of the same material having the one refraction index.

In operation, after light beams transmit into the BEF 15 through the lower protective layer 158, refractions occur in the BEF 15 according to Snell's law until the light beams emit from the BEF 15 through the upper protective layer 150. Under Snell's law, because the refraction index of the upper protective layer 150 is smaller than that of the upper prism structures 152 and the lower prism structures 156, and because the refraction index of the lower protective layer 158 is greater than that of the upper prism structures 152 and the lower prism structures 156, the light beams emitting from the upper protective layer 150 are substantially perpendicular to the upper protective layer 150.

The upper prism structures 152 are covered by the upper protective layer 150, and the lower prism structures 156 are covered by the lower protective layer 158. With the above-described configuration, the upper prism structures 152 and the lower prism structures 156 can be protected from being scraped. This enables the liquid crystal display 1 to provide unencumbered good optical performance. Further, the upper prism structures 152 and the lower prism structures 156 are integrated with the main body 154. Therefore in assembly, unlike in conventional art, there is no need for a step of aligning the upper prism structures 152 and the lower prism structures 156. That is, the liquid crystal display 1 can be conveniently assembled.

Figure 3:
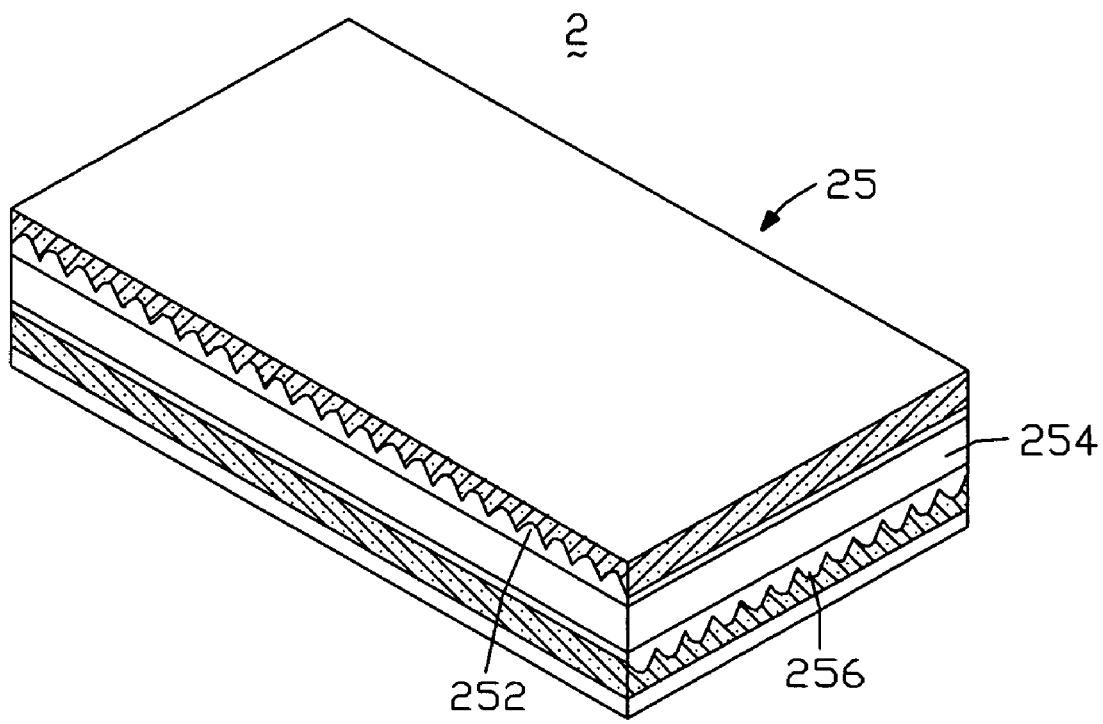
FIG. 3 is similar to FIG. 2, but showing a corresponding view in the case of a BEF of a liquid crystal display according to a second embodiment of the present invention.

Referring to FIG. 3, this shows a BEF 25 of a liquid crystal display 2 according to a second embodiment of the present invention. The BEF 25 is similar to the BEF 15. However, the BEF 25 includes a main body 254, and a plurality of upper prism structures 252 and a plurality of lower prism structures 256 formed at two opposite main surfaces (not labeled) of the main body 254. The upper prism structures 252 and the lower prism structures 256 each have a plurality of generally triangular prisms with rounded apexes (not labeled). The liquid crystal display 2 can achieve advantages similar to those of the liquid crystal display 1.

Figure 4:
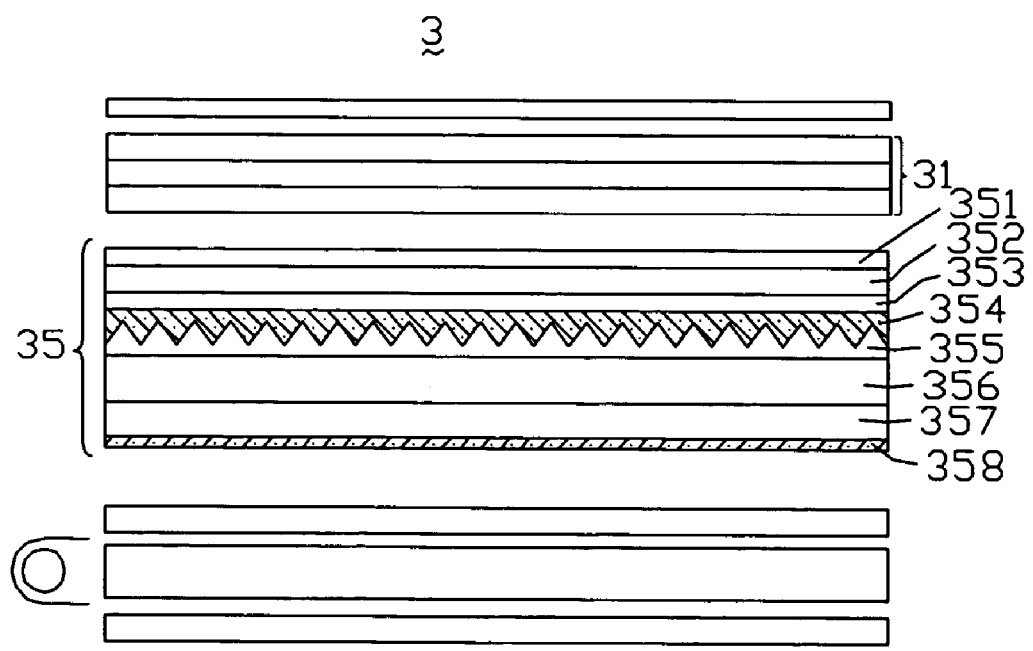
FIG. 4 is an exploded, side cross-sectional view of a liquid crystal display according to a third embodiment of the present invention.

Referring to FIG. 4, a liquid crystal display 3 according to a third embodiment of the present invention is similar in principle to the liquid crystal display 1. However, the liquid crystal display 3 includes a polarizing BEF 35. The polarizing BEF 35 includes an adhesive layer 351, a protective film 352, a polarizing layer 353, an upper protective layer 354, a plurality of upper prism structures 355, a main body 356, a plurality of lower prism structures 357, and a lower protective layer 358, stacked in that order from top to bottom. The adhesive layer 351 can facilitate attachment of the polarizing BEF 35 to a liquid crystal panel 31 of the liquid crystal display 3. The protective film 352 protects the polarizing layer 353. The polarizing layer 353 is preferably made from polyvinyl alcohol (PVA).

The liquid crystal display 3 can achieve advantages similar to those of the liquid crystal display 1. Further, in assembly, unlike in conventional art, there is no need for a step of aligning the polarizing BEF 35 with a polarizing film. That is, the liquid crystal display 3 can be conveniently assembled.

Figure 5:
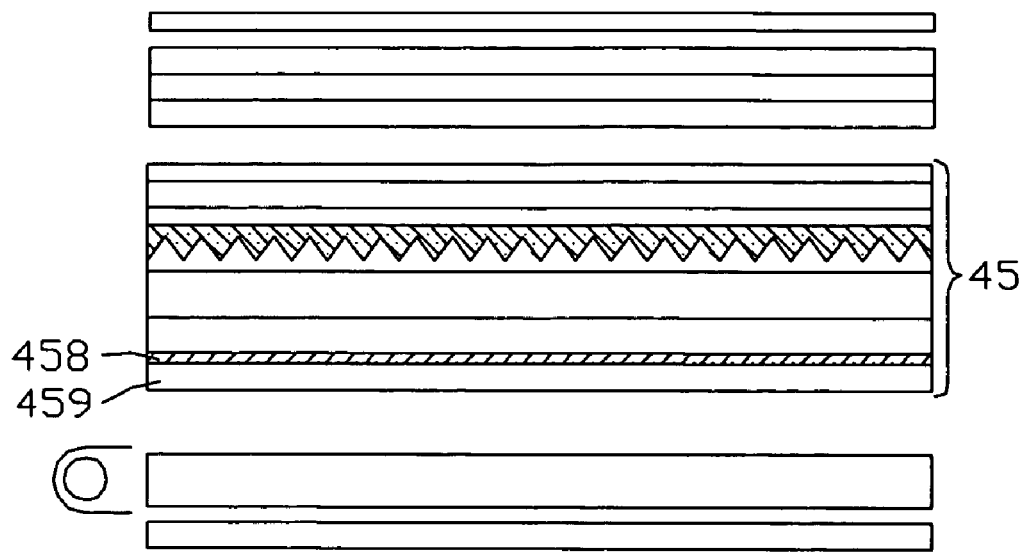
FIG. 5 is an exploded, side cross-sectional view of a liquid crystal display according to a fourth embodiment of the present invention.
Figure 6:
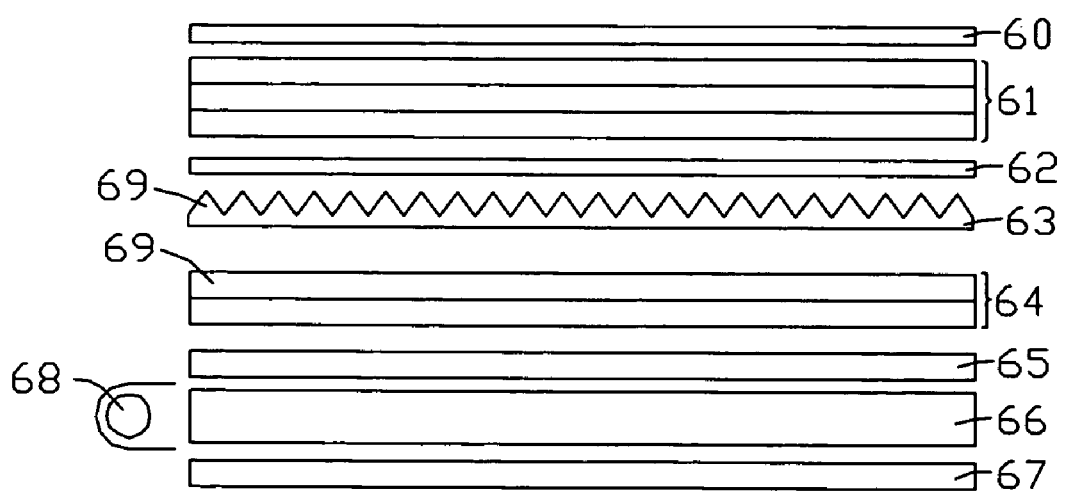
FIG. 6 is an exploded, side view of a conventional liquid crystal display.

Referring to FIG. 5, a liquid crystal display 4 according to a fourth embodiment of the present invention is similar in principle to the liquid crystal display 1 and similar to the liquid crystal display 3. However, the liquid crystal display 4 includes a BEF 45. The BEF 45 includes a diffusing layer 459 coated on a lower surface (not labeled) of a lower protective layer 458. Because the diffusing layer 459 is not a separate structure, the liquid crystal display 4 can be conveniently assembled.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A brightness enhancement film comprising:
   a main body comprising:
      a first side; and
      a second side opposite to the first side;
   a plurality of first prism structures formed at the first side;
   a plurality of second prism structures formed at the second side, a refraction index of the first prism structures being substantially equal to a refraction index of the second prism structures, and a refraction index of the main body being substantially equal to a refraction index of the second prism structures; and
   at least one protective layer covering at least one of the plurality of first prism structures and the plurality of second prism structures, wherein the at least one protective layer is a first protective layer covering the plurality of first prism structures, and a second protective layer covering the plurality of second prism structures, and a refraction index of the first protective layer is less than the refraction index of the first prism structures.

2. The brightness enhancement film in claim 1, wherein a refraction index of the second protective layer is greater than the refraction index of the second prism structures.

3. The brightness enhancement film in claim 1, wherein an orientation of the first prism structures is substantially perpendicular to an orientation of the second prism structures.

4. The brightness enhancement film in claim 1, wherein the first prism structures and the second prism structures each comprise a plurality of triangular prisms or generally triangular prisms with rounded apexes.

5. The brightness enhancement film in claim 1, further comprising a polarizing layer provided thereon.

6. The brightness enhancement film in claim 5, further comprising a protective film covering the polarizing layer.

7. The brightness enhancement film in claim 6, further comprising an adhesive layer provided thereon.

8. The brightness enhancement film in claim 1, further comprising a diffusing layer provided thereon.

9. A backlight module comprising:
   a light guide plate comprising a light input surface and a light output surface;
   a light source adjacent to the light input surface of the light guide plate; and
   a brightness enhancement film facing the light output surface of the light guide plate, the brightness enhancement film comprising:
   a main body comprising:
      a first side; and
      a second side opposite to the first side;
   a plurality of first prism structures formed at the first side;
   a plurality of second prism structures formed at the second side, a refraction index of the first prism structures being substantially equal to a refraction index of the second prism structures, and a refraction index of the main body being substantially equal to a refraction index of the second prism structures; and at least one protective layer covering at least one of the plurality of first prism structures and the plurality of second prism structures, wherein the at least one protective layer is a first protective layer covering the plurality of first prism structures, and a second protective layer covering the plurality of second prism structures, and a refraction index of the first protective layer is less than the refraction index of the first prism structures.

10. The backlight module in claim 9, further comprising a polarizing layer provided thereon.

11. The backlight module in claim 10, further comprising a protective film covering the polarizing layer.

12. The backlight module in claim 11, further comprising an adhesive layer provided thereon.

13. The backlight module in claim 9, further comprising a diffusing layer provided thereon.

14. A liquid crystal display comprising:
   a liquid crystal panel; and
   a backlight module located adjacent to the liquid crystal panel, the backlight module comprising:
      a light guide plate comprising a light input surface and a light output surface;
      a light source adjacent to the light input surface of the light guide plate; and
      a brightness enhancement film facing the light output surface of the light guide plate, the brightness enhancement film comprising:
         a main body comprising:
            a first side; and
            a second side opposite to the first side;
         a plurality of first prism structures formed at the first side;
         a plurality of second prism structures formed at the second side, a refraction index of the first prism structures being substantially equal to a refraction index of the second prism structures, and a refraction index of the main body being substantially equal to a refraction index of the second prism structures; and
      at least one protective layer covering at least one of the plurality of first prism structures and the plurality of second prism structures, wherein the at least one protective layer is a first protective layer covering the plurality of first prism structures, and a second protective layer covering the plurality of second prism structures, and a refraction index of the first protective layer is less than the refraction index of the first prism structures.

* * * * *